United States Patent
Senofonte et al.

(10) Patent No.: US 9,657,687 B2
(45) Date of Patent: May 23, 2017

(54) EXHAUST DUCT LINER ROD HANGER

(71) Applicant: United Technologies Corporation, Hartford, CT (US)

(72) Inventors: Paul R. Senofonte, Jupiter, FL (US); Jose E. Ruberte Sanchez, Jupiter, FL (US)

(73) Assignee: Powerbreather International GmbH (DE)

(*) Notice: Subject to any disclaimer, the term of this patent is extended or adjusted under 35 U.S.C. 154(b) by 390 days.

(21) Appl. No.: 14/478,171

(22) Filed: Sep. 5, 2014

(65) Prior Publication Data

US 2015/0071704 A1 Mar. 12, 2015

Related U.S. Application Data

(60) Provisional application No. 61/876,902, filed on Sep. 12, 2013.

(51) Int. Cl.
*F02K 1/80* (2006.01)
*F02K 1/82* (2006.01)

(52) U.S. Cl.
CPC ............... *F02K 1/80* (2013.01); *F02K 1/82* (2013.01); *Y02T 50/671* (2013.01); *Y10T 29/49895* (2015.01); *Y10T 403/56* (2015.01)

(58) Field of Classification Search
CPC ... F02K 1/80; F02K 1/82; F02K 1/822; F02C 7/20; Y02T 50/675; Y10T 403/4662; Y10T 403/4668; Y10T 403/4671
See application file for complete search history.

(56) References Cited

U.S. PATENT DOCUMENTS

| | | | |
|---|---|---|---|
| 3,645,162 A * | 2/1972 | Welch | F16B 5/0036 411/339 |
| 4,180,972 A | 1/1980 | Herman et al. | |
| 4,460,147 A * | 7/1984 | Macbain | F16B 12/22 248/222.41 |
| 4,555,901 A | 12/1985 | Wakeman et al. | |
| 4,587,788 A * | 5/1986 | Bielicki | E04B 1/6137 256/59 |
| 5,292,227 A | 3/1994 | Czachor et al. | |
| 5,323,601 A | 6/1994 | Jarrell et al. | |
| 5,704,208 A | 1/1998 | Brewer et al. | |
| 5,716,154 A * | 2/1998 | Miller | B60R 11/00 403/22 |
| 6,163,959 A | 12/2000 | Arraitz et al. | |
| 6,357,957 B1 * | 3/2002 | Champlin | B60R 13/0206 296/72 |
| 6,588,971 B2 * | 7/2003 | Welch | F16B 12/00 24/669 |

(Continued)

OTHER PUBLICATIONS

U.S. Appl. No. 61/766,444, filed Feb. 19, 2013.
U.S. Appl. No. 61/764,782, filed Feb. 14, 2013.
U.S. Appl. No. 61/764,785, filed Feb. 14, 2013.

*Primary Examiner* — Daniel Wiley
(74) *Attorney, Agent, or Firm* — Kinney & Lange, P.A.

(57) ABSTRACT

A hanger is disclosed that has a movable component and a bracket. The movable component has a shaft with a threaded portion, a slider connected to the shaft, and a cap configured to join with the threaded portion. The bracket defines a racetrack aperture and an ingress/egress aperture. The racetrack aperture and the ingress/egress aperture are connected.

15 Claims, 3 Drawing Sheets

(56) References Cited

U.S. PATENT DOCUMENTS

| | | | |
|---|---|---|---|
| 6,672,833 B2 | 1/2004 | MacLean et al. | |
| 7,281,899 B1 * | 10/2007 | Bucher | F04D 25/088 29/889.1 |
| 7,339,244 B2 | 3/2008 | Subramanian et al. | |
| 7,762,782 B2 * | 7/2010 | Wang | F04D 25/088 416/210 R |
| 8,197,216 B2 * | 6/2012 | Wang | F04D 25/088 416/210 R |
| 8,418,473 B2 * | 4/2013 | Petty | F01D 25/28 403/144 |
| 8,573,880 B2 * | 11/2013 | Chen | A47B 47/042 403/331 |
| 2012/0099924 A1 * | 4/2012 | Chen | F16B 35/048 403/345 |
| 2012/0233845 A1 | 9/2012 | Gerengi | |

* cited by examiner

EXHAUST DUCT LINER ROD HANGER

BACKGROUND

The present invention related generally to gas turbine engines, and more particularly to mechanisms for coupling turbine exhaust ducts to liners.

Gas turbine engines operate at high temperatures and pressures, necessitating structures that can operate under extreme conditions. For example, in the exhaust section of a gas turbine engine, high temperature exhaust gases are often vented through a shaped liner. The liner section is typically made of a material capable of enduring high temperatures, and often incorporates cooling features such as effusion holes or slots. Nonetheless, such liners often heat to several hundred degrees above ambient conditions, and can deform due to thermal expansion and pressure loads.

As such, the liner has typically been separated from structural components surrounding it using fasteners. These structural components may, in combination with the liner, form a cooling air plenum. Fasteners pass through cooling air plena to connect liners to structural components.

Two known fasteners, disclosed in commonly-assigned U.S. Provisional Pat. App. No. 61/764,785 (filed 14 Feb. 2013) and commonly-assigned U.S. Provisional Pat. App. No. 61/766,444 (filed 19 Feb. 2013), incorporate T-bar fasteners with shaft and crossbar portions. The shaft portion of the T-bar passes through an aperture in a first spaced component, and the crossbar portion of the T-bar is arranged adjacent to a second spaced component. A bracket is coupled to the second spaced component to capture the T-bar.

SUMMARY

A hanger includes a movable component and a bracket. The movable component includes a shaft having a threaded portion, a slider connected to the shaft, and a cap configured to join with the threaded portion. The bracket defines a racetrack aperture and an ingress/egress aperture. The racetrack aperture and the ingress/egress aperture are connected.

Figure 1:
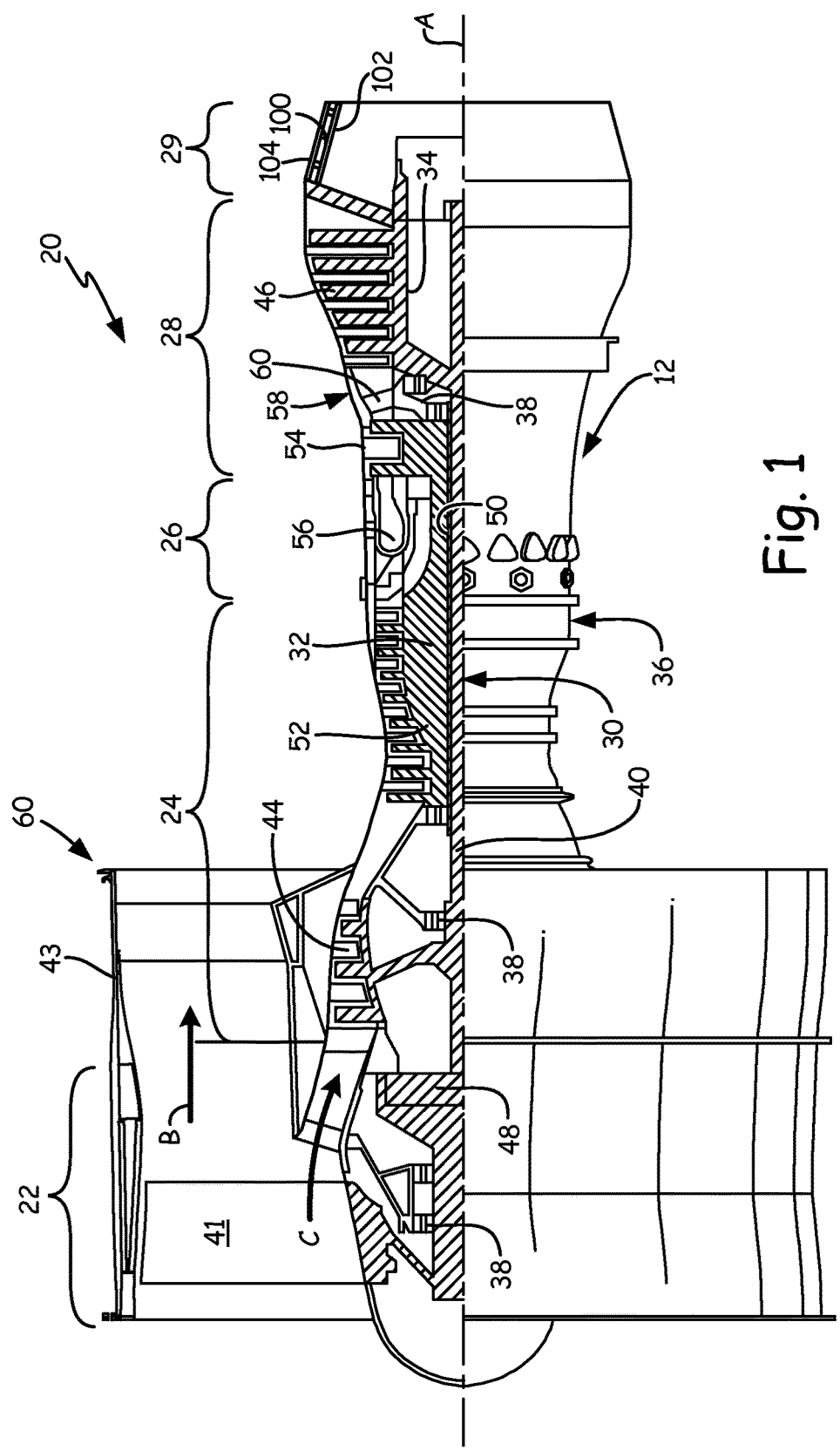
FIG. 1 is a quarter sectional view that schematically illustrates an example gas turbine engine.

While the above-identified figures set forth embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Exhaust ducts and liners of gas turbine engines are spaced apart, with a cooling air plenum in between. Due to the geometries of many common exhaust liners and ducts, fastening one to the other entails several technical challenges. The hanger described herein is replaceable without necessitating burdensome disassembly of the liner/duct structure. No shims or rigging are required to use the hanger, and the hanger is capable of operating in both tension and compression modes. The fastener permits relative movement between a duct and attached liner within suitable limits. Such movement may be caused by thermal expansion and/or parts tolerance. However, the fastener maintains a desired distance between the duct and liner.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. It should be further understood that the disclosed non-limiting embodiment provides generally a ballistic barrier that is suitable for many types of rotating or rotary machines as known to those of ordinary skill in the art.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 41 and low pressure (or first) compressor section 44 to low pressure (or first) turbine section 46. Inner shaft 40 drives fan 41 through a speed change device, such as geared architecture 48, to drive fan 41 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 and then by high pressure compressor 52, mixed with fuel and ignited in combustor 56 to produce high speed exhaust gases, and then expanded through high pressure turbine 54 and low pressure turbine 46. Mid-turbine frame 58 includes vanes 60, which are in the core airflow path and function as an inlet guide vane for low pressure turbine 46. Utilizing vane 60 of mid-turbine frame 58 as the inlet guide vane for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram \,°R)/518.7°\,R]^{0.5}$. The "Low corrected fan tip speed", as disclosed herein according to one non-limiting embodiment, is less than about 1150 ft/second.

The example gas turbine engine includes fan 41 that comprises in one non-limiting embodiment less than about twenty-six fan blades 42 and fan case 43 surrounding fan 41. In another non-limiting embodiment, fan section 22 includes less than about twenty fan blades 42. Moreover, in one disclosed embodiment low pressure turbine 46 includes no more than about six turbine rotors schematically indicated at 34. In another non-limiting example embodiment low pressure turbine 46 includes about three turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Augmentor 29 includes a duct and liner structure, as is described in more detail with reference to FIGS. 2 and 3. Exhaust gas passing through augmentor 29 is extremely hot. Surrounding the hot exhaust gas is a system including at least one hanger 100, liner 102, and duct 104. Liner 102 and duct 104 bound a cooling plenum P (FIG. 3), which can be fed with working fluid at a lower temperature than the exhaust gases from combustor section 26. For example, the cooling air plenum may be fed with bleed air from compressor section 24. Fluid routed through plenum P (FIG. 3) can be used, through any suitable mechanism (e.g. diffusion, effusion, film, convective, and/or impingement cooling), to help protect duct 104 and/or liner 102 from being damaged by the exhaust gases from turbine section 28.

Figure 2:
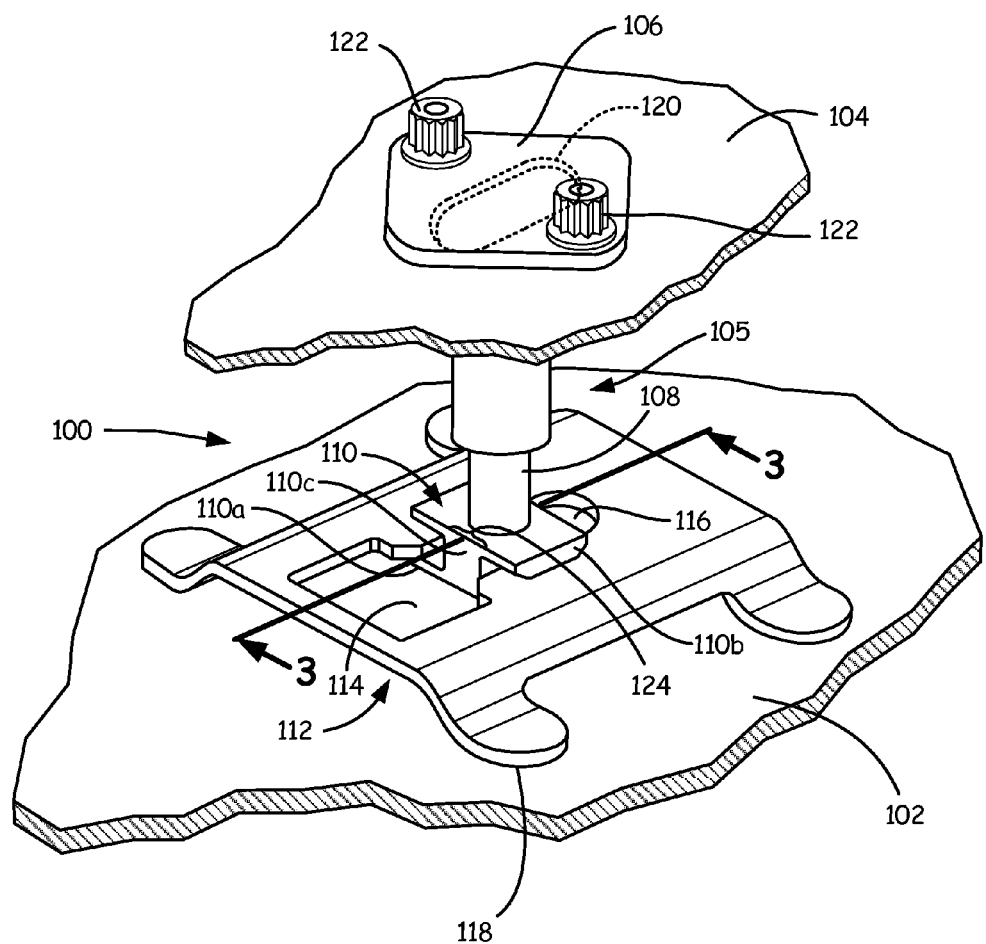
FIG. 2 is a perspective view of a hanger connecting an exhaust liner to a duct.
Figure 3:
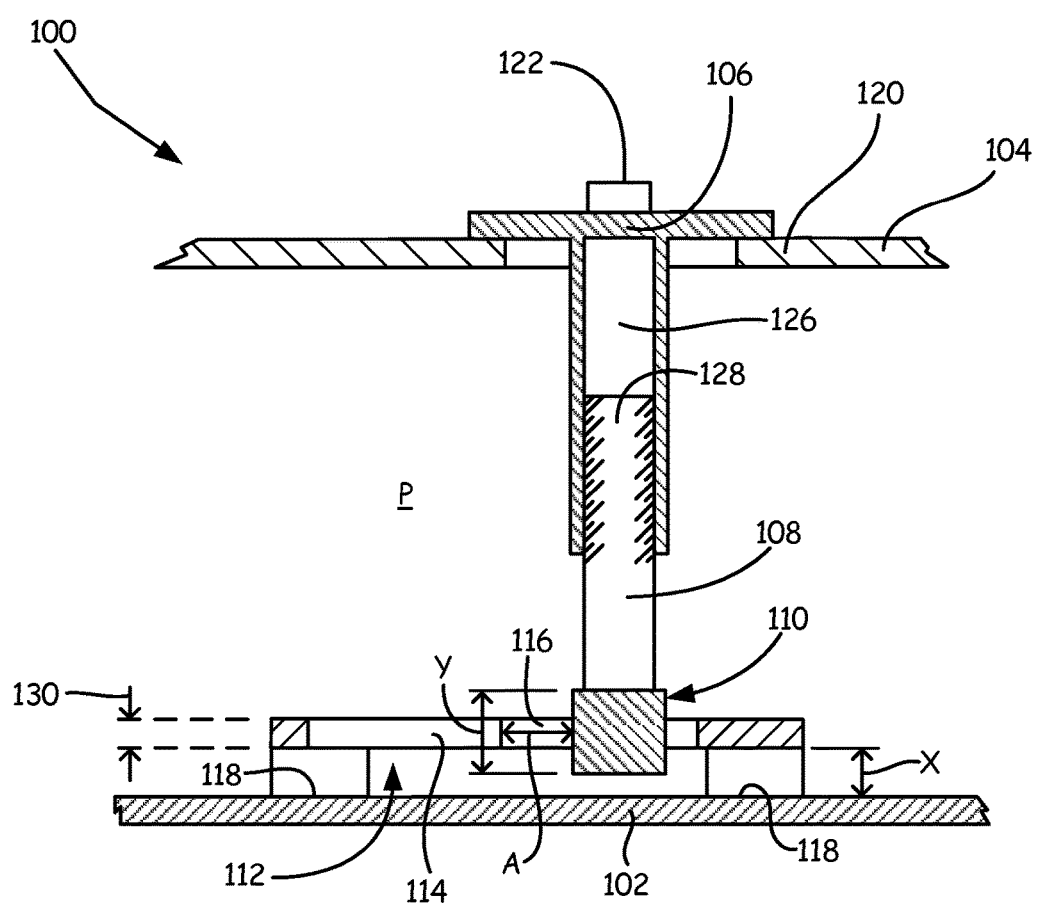
FIG. 3 is a cross-section of the hanger of FIG. 2 viewed from line 3-3.

FIG. 2 is a perspective view of an embodiment of hanger 100 connecting liner 102 to duct 104. As shown in FIG. 2, liner 102 and duct 104 are broken away. Hanger 100 includes fastener component 105 (which includes cap 106, shaft 108, and slider 110), and bracket 112. Bracket 112 captures slider 110 and couples hanger 100 to liner 102. FIG. 3 is a cross-section of hanger 100 viewed from line 3-3 of FIG. 2. The cross-section shown illustrates cavity 126 and threaded portion 128, as well as the various portions of slider 110, including first platform 110a and second platform 110b, and neck 110c, and their relationship with bracket 112 having thickness 130.

Hanger 100 can be coupled to liner 102 and duct 104. Bracket 112 includes ingress/egress port 114 and racetrack slot 116, which are connected apertures defined by bracket 112. Ingress/egress port 114 is large enough to admit a portion of slider 110 to pass through and be slid along racetrack slot 116, as shown in FIG. 3. Bracket 112 also includes connection interfaces 118, which are configured to be coupled to an article arranged adjacent to bracket 112, such as liner 102. In the illustrated embodiment, bracket 112 is affixed to liner 102 at connection interfaces 118 by welding, though other attachment mechanisms can be used in further embodiments.

Hanger 100 is also connected to duct 104. Cap 106 is positioned within cap aperture 120 that is defined by duct 104. A portion of cap 106 extends from aperture 120 on both sides of duct 104. Cap 106 is affixed to duct 104 using fasteners 122. Fasteners 122 may be any known fastener, such as bolts, rivets, screws, or welds. In some embodiments, fasteners 122 are removable to permit hanger 100 to be easily installed and uninstalled without causing damage to hanger 100 or duct 104.

Slider 110 of hanger 100 is positioned within racetrack slot 116. Width 124 of slider 110 is configured to be narrow enough to allow slider 110 to slide along racetrack slot 116, but wide enough to prevent rotation of slider 110 relative to bracket 112. Furthermore, slider 110 is positioned within racetrack slot 116 of bracket 112 such that movement of liner 102 in the direction towards or away from duct 104 would also cause movement of slider 110.

The orientation of each hanger 100, and in particular the orientation of bracket 112, can be selected such that during normal operation thermal expansion and/or pressure gradients cause liner 102 to shift relative to duct 104 along the length of racetrack slot 116. Further, liner 102 may rotate relative to duct 104, causing slider 110 to rotate and shaft 108 to be threaded either into or out of cap 106, depending on the direction of rotation. Bracket 112 can be positioned such that racetrack slot 116 is aligned parallel to axis A, for example in an embodiment in which liner 102 and duct 104 are frustoconical. In other embodiments, such as those in which liner 102 and duct 104 are irregularly shaped (e.g. with ellipsoid or snail-shell cross-sections), hanger 100 can be arranged to permit limited displacement between liner 102 and duct 104 along a direction that varies based on expected thermal growth at each position along liner 102. Thus, in these non-uniform liner embodiments, racetrack slot 116 will be aligned to account for thermal expansion and other shifting caused by pressure gradients along liner 102 and duct 104.

Slider 110 can be integrally and monolithically formed with shaft 108, which includes threaded portion 128. Threaded portion 128 is threadably connected to cap 106, which is in turn connected to duct 104 via fasteners 122. Thus, hanger 100 limits relative movement of liner 102 towards or away from duct 104. However, hanger 100 does not prevent relative movement of liner 102 relative to duct in other directions. For example, liner 102 may move parallel to duct 104, such that slider 110 slides along racetrack slot 116.

During operation, duct 104 may not be heated as much as liner 102, due to liner 102 being in closer relative proximity to hot gases. Thus, it is desirable to provide one or more hangers 100 that permit relative movement between liner 102 and duct 104 to accommodate different levels of thermal growth. Plenum P is defined between liner 102 and duct 104 to permit for cooling air to pass, as previously described. Multiple hangers (e.g. hanger 100) can be used to hold liner 102 within duct.

Bracket 112 has thickness 130. Slider 110 of hanger 100 is arranged within racetrack slot 116. In the embodiment shown in FIG. 3, first platform 110a is arranged along a first plane, and second platform 110b is arranged along a parallel plane. First platform 110a and second platform 110b of slider 110 are not small enough to pass through racetrack slot 116, but neck portion 110c of slider 110 is. Neck portion 110c is only slightly thicker than thickness 130 of bracket 112, such that thermal expansion of slider 110 and/or bracket 112 do not cause slider 110 to bind in racetrack slot 116. Thus, slider 110 is free to move along racetrack slot 116, as indicated by arrow A. Overall height Y of slider 110 is greater than bracket height X, such that slider 110 cannot be completely positioned between bracket 112 and liner 102.

Installation and uninstallation of hanger 110 can be accomplished by affixing bracket 112 to liner 102. In one embodiment, bracket 112 is affixed to liner 102 by brazing at connection interface 118. Slider 110 can then be inserted into racetrack slot 116. Because slider 110 and shaft 108 are integrally formed, this result in shaft 108 extending away from liner 102. Shaft 108 includes threaded portion 128, which can be located at the opposite end of shaft 108 from slider 110. Cap 106 is inserted through cap aperture 120 of duct 104. Cap aperture 120 is an elongated aperture defined by duct 104, such that cap 106 may be positioned to receive threaded portion 128 of shaft 108. In addition to permitting a range of positions of cap 106, the elongated structure of cap aperture 120 enhances lines of sight for mechanics installing hanger 100. Cap 106 is rotated to threadably connect to shaft 108. Because cap 106 is too large to completely pass through cap aperture 120, liner 102 is now coupled to duct 104 within a distance limited by hanger 100.

The gap between liner 102 and duct 104 defines a plenum P through which cooling air can be routed. This gap may be adjusted by threading or unthreading cap 106 from shaft 108. When liner 102 and shaft 104 are at a desired distance from one another, cap 106 is attached to duct 104 by fasteners 122, which also prevent relative rotation between duct 104 and cap 106.

Cap 106 and shaft 108 define cavity 126, which is a hollow portion of cap 106 that is not filled by shaft 108. Cap 106 may rotate relative to shaft 108, which causes threading or unthreading of threaded portion 128 in cap 106, and proportional increase or decrease in size of cavity 126. In addition to allowing relative rotation of liner 102 and duct 104, cavity 126 also reduces the weight of hanger 100 as compared to a solid device.

Slider 110 can be attached to cap 106 prior to inserting slider 110 into racetrack slot 116. For example, fastener component 105 of hanger 100 may be inserted after liner 102 and duct 104 have already been positioned at or near their desired operating positions. Fastener component 105, which includes slider 110, shaft 108, and cap 106, can be preassembled and then inserted through cap aperture 120 together as a single piece. Because cap aperture 120 is elongated, slider 110, shaft 108, and cap 106 may be inserted at a variety of angles and lateral positions along cap aperture 120.

Slider 110 is routed first through ingress/egress port 114, then positioned along racetrack slot 116. Width 124 (FIG. 2) is the smallest dimension of slider 110, and is the only dimension of slider 110 that will fit through racetrack slot 116. Thus, it is not possible to slide slider 110 onto racetrack slot 116 in an incorrect orientation. Furthermore, because first platform 110a and second platform 110b are too large to fit through racetrack slot 116, once hanger 100 is installed it operates in both compression and tension modes. In some locations, only tension mode is required, but in others, particularly in serpentine ducts, both compression and tension modes are necessary to support liner 102 within duct 104.

The following are non-exclusive descriptions of possible embodiments of the present invention.

A hanger includes a fastener component. The fastener component includes a shaft having a threaded portion, a slider connected to the shaft, and a cap configured to join with the threaded portion. The hanger also includes a bracket that defines a racetrack aperture and an ingress/egress aperture. The racetrack aperture and ingress/egress aperture are connected.

The hanger of the preceding paragraph can optionally include, additionally and/or alternatively, any one or more of the following features, configurations and/or additional components:

The slider may include a first platform, a second platform, and a neck portion interposed between the first platform and the second platform. The first platform may be configured to fit through the ingress/egress aperture. The neck portion may be configured to slidably fit into the racetrack aperture. A width of the neck portion may be configured such that the slider cannot rotate with respect to the bracket when positioned in the racetrack aperture. The hanger may also include a fastener passing through the cap. The first platform may extend along a first plane, the second platform may extend along a second plane, and the first plane may be parallel to the second plane. A distance between the first platform and the second platform may be greater than a thickness of the bracket. The cap and the shaft may circumscribe a cavity.

A fastening system includes a first component, a second component arranged a distance from the first component, a cap passing through a cap aperture defined by the first component, and a fastener. The fastener includes a shaft having a threaded portion, wherein the threaded portion is joined to the cap, a slider connected to the shaft, and a bracket connected to the second component. The bracket defines a racetrack aperture and an ingress/egress aperture that are connected, wherein the slider is configured to slidably engage the racetrack aperture.

The fastening system of the preceding paragraph can optionally include, additionally and/or alternatively, any one or more of the following features, configurations and/or additional components:

The first component may be a liner and the second component may be a duct wall. The slider may include a first platform, a second platform, and a neck portion interposed between the first platform and the second platform. The first platform may be configured to fit through the ingress/egress aperture, and the neck portion may be configured to slidably fit into the racetrack aperture. A width of the neck portion may be configured such that the slider cannot rotate with respect to the bracket when positioned in the racetrack aperture. The fastening system may also include a fastener passing through the cap. The first platform may extend along a first plane, the second platform may extend along a second plane, and the first plane may be parallel to the second plane. A distance between the first platform and the second platform may be greater than a thickness of the bracket.

A method for connecting a first component and a second component includes attaching a bracket to the second component, the bracket defining a racetrack aperture and an ingress/egress aperture that are connected, positioning a movable component having a shaft and a slider such that a first platform of the slider is routed through the ingress/egress aperture, a second platform of the slider is not routed through the ingress/egress aperture, and a neck portion of the slider is positioned within the ingress/egress aperture, and sliding the slider along the racetrack aperture such that a neck portion of the slider is positioned within the racetrack aperture.

The method of the preceding paragraph can optionally include, additionally and/or alternatively, any one or more of the following features, steps, configurations and/or additional components:

The method may include threading a cap onto threaded portion of the shaft and inserting a fastener through the cap and the first component. The cap may be positioned within a cap aperture defined by the first component.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A hanger comprising:
a fastener component including:
a shaft extending along an axis and having a threaded portion;
a slider connected to the shaft, the slider comprising:
a first platform;
a second platform; and
a neck portion between the first and second platforms; and
a cap configured to join with the threaded portion; and
a bracket that defines an aperture with an ingress/egress port and a slot, wherein the slot and the ingress/egress port are connected;
wherein the neck portion of the slider is configured to slidably engage the slot such that the slider cannot rotate about the axis with respect to the bracket.

2. The hanger of claim 1, wherein the first platform is configured to fit through the ingress/egress port.

3. The hanger of claim 1, and further comprising a fastener passing through the cap.

4. The hanger of claim 1, wherein:
the first platform extends along a first plane;
the second platform extends along a second plane; and
the first plane is parallel to the second plane.

5. The hanger of claim 4, wherein a distance between the first platform and the second platform is greater than a thickness of the bracket.

6. The hanger of claim 1, wherein the cap and the shaft circumscribe a cavity.

7. A fastening system comprising:
a first component;
a second component arranged a distance from the first component;
a cap passing through a cap aperture defined by the first component;
a fastener component including:
a shaft extending along an axis and having a threaded portion, wherein the threaded portion is joined to the cap; and
a slider connected to the shaft, the slider comprising:
a first platform;
a second platform; and
a neck portion between the first and second platforms; and
a bracket connected to the second component, the bracket defining an aperture with an ingress/egress port and a slot that are connected, wherein the neck portion of the slider is configured to slidably engage the slot such that the slider cannot rotate about the axis with respect to the bracket.

8. The fastening system of claim 7, wherein the first component is a liner and the second component is a duct wall.

9. The fastening system of claim 7, wherein the first platform is configured to fit through the ingress/egress port.

10. The fastening system of claim 7, and further comprising a fastener passing through the cap.

11. The fastening system of claim 7, wherein:
the first platform extends along a first plane;
the second platform extends along a second plane; and
the first plane is parallel to the second plane.

12. The fastening system of claim 7, wherein a distance between the first platform and the second platform is greater than a thickness of the bracket.

13. A method for connecting a first component and a second component, the method comprising:
attaching a bracket to the second component, the bracket defining an aperture with an ingress/egress port and a slot that are connected;
positioning a movable component having a shaft extending along an axis and a slider connected to the shaft such that:
a first platform of the slider is routed through the ingress/egress aperture;
a second platform of the slider is not routed through the ingress/egress aperture; and
a neck portion of the slider between the first and second platforms is positioned within the ingress/egress aperture such that the slider cannot rotate about the axis with respect to the bracket;
sliding the slider along the aperture such that a neck portion of the slider is positioned within the aperture; and
connecting the first component to the movable component.

14. The method of claim 13, wherein connecting the first component to the movable component comprises:
threading a cap onto a threaded portion of the shaft; and
inserting a fastener through the cap and the first component.

15. The method of claim 14, wherein the cap is positioned within a cap aperture defined by the first component.

* * * * *